United States Patent
Taylor et al.

(10) Patent No.: US 8,937,441 B1
(45) Date of Patent: Jan. 20, 2015

(54) SURGE SUPPRESSOR

(71) Applicants: Kenneth W. Taylor, Clayton, NC (US); Frankie C. Bunch, Clayton, NC (US); John H. Banks, Jr., Greenville, NC (US); Kenneth M. Hurd, Matthews, NC (US)

(72) Inventors: Kenneth W. Taylor, Clayton, NC (US); Frankie C. Bunch, Clayton, NC (US); John H. Banks, Jr., Greenville, NC (US); Kenneth M. Hurd, Matthews, NC (US)

(73) Assignee: Energylite, Inc., Morrisville, NC (US)

( * ) Notice: Subject to any disclaimer, the term of this patent is extended or adjusted under 35 U.S.C. 154(b) by 0 days.

(21) Appl. No.: 14/014,741

(22) Filed: Aug. 30, 2013

Related U.S. Application Data

(60) Provisional application No. 61/695,444, filed on Aug. 31, 2012.

(51) Int. Cl.
  H05B 37/00    (2006.01)
  H02H 9/00     (2006.01)
  H05B 33/08    (2006.01)

(52) U.S. Cl.
  CPC ............ *H02H 9/005* (2013.01); *H05B 33/089* (2013.01)
  USPC ............ 315/290; 315/123; 361/103; 361/118

(58) Field of Classification Search
  USPC .............. 361/1, 117, 118, 106, 103; 315/119, 315/121, 123, 125, 127, 291, 289, 290
  See application file for complete search history.

(56) References Cited

U.S. PATENT DOCUMENTS

| | | | | |
|---|---|---|---|---|
| 5,703,438 | A * | 12/1997 | Nguyen | 315/291 |
| 6,057,650 | A * | 5/2000 | Betz et al. | 315/289 |
| 2002/0054465 | A1* | 5/2002 | Gerlach | 361/111 |
| 2007/0086141 | A1* | 4/2007 | Elms | 361/118 |
| 2007/0159757 | A1* | 7/2007 | Moffatt | 361/118 |
| 2013/0049589 | A1* | 2/2013 | Simi | 315/85 |

OTHER PUBLICATIONS

Littelfuse, Axial Lead & Cartridge Fuses, 477 Series, dated 2009 Littelfuse, Inc.
Anthem—SL 12 1RO10 NTC Thermistor; information retrieved from the internet; Mar. 29, 2013.

* cited by examiner

*Primary Examiner* — David H Vu
(74) *Attorney, Agent, or Firm* — MacCord Mason PLLC

(57) ABSTRACT

A lighting installation includes a light fixture having a socket adapted to electrically connect to at least one lamp, the light fixture having a line voltage input, a neutral input and a ground input. Also included is a circuit for suppressing electrical surges including output leads for line voltage and neutral to the socket, a first varistor connecting the line voltage input and ground input, a second varistor connecting the line voltage input and neutral input, a third varistor connecting the ground input and neutral input, a resistor connecting the line voltage input and line voltage output, and a resistor connecting the neutral input and neutral output.

5 Claims, 5 Drawing Sheets

SURGE SUPPRESSOR

BACKGROUND OF THE INVENTION

Lighting such as security lighting can be vulnerable to voltage or current surges, damaging the lamp and/or the fixture in which the lamp is mounted. In almost all cases, security lights do not have a dedicated earth ground, and the neutral and ground are tied together at the transformer. This allows transients to build up and with no ground to dissipate those transients, it will eventually damage the light engine and/or driver. This is a well-known problem in the field, with no prior solution known to exist.

Lights that are mounted downstream from an electrical box would normally be grounded. The issue with unresolved transients arises in lights mounted on poles that are upstream of a residential or other separately grounded electrical box, which are the majority of cases. These have the ground and neutral tied together back at the transformer and no dedicated ground fixture.

The same problem can occur with other loads, such as, but not limited to, other lighting circuits, motor circuits other resistive loads, and other electrical and/or electronic equipment.

SUMMARY OF THE INVENTION

The present invention fulfills one or more of these needs in the art by providing an apparatus for suppressing electrical surges. A circuit component has input leads for line voltage, neutral and ground; the neutral and ground may be electrically directly connected upstream of the circuit. The circuit component has output leads for line voltage and neutral, and a first varistor connects the line voltage input and ground input. Second and third varistors connect the line voltage input and neutral input. A fourth varistor connects the ground input and neutral input. A thermistor paralleled with a resistor connects the line voltage input and line voltage output, and a thermistor paralleled with a resistor connects the neutral input and neutral output.

In another embodiment the apparatus for suppressing electrical surges includes a circuit component with input leads for line voltage, neutral and ground, in which the neutral and ground may be electrically directly connected upstream of the circuit, and output leads for line voltage and neutral, a first varistor connecting the line voltage input and ground input, a second varistor connecting the line voltage input and neutral input, a third varistor connecting the ground input and neutral input, a resistor connecting the line voltage input and line voltage output, and a resistor connecting the neutral input and neutral output.

In either embodiment a fuse can be included in the input lead for the line voltage. Similarly, either embodiment can be implemented with a printed circuit board, wherein the varistors and resistors are mounted on the printed circuit board, with the printed circuit board having traces to provide electrically conductive paths for the circuit component.

The invention can also be considered as a lighting installation that includes a light fixture having a socket adapted to electrically connect to at least one lamp, the light fixture having a line voltage input, a neutral input and a ground input and a circuit for suppressing electrical surges including output leads for line voltage and neutral to the socket, a first varistor connecting the line voltage input and ground input, a second varistor connecting the line voltage input and neutral input, a third varistor connecting the ground input and neutral input, a resistor connecting the line voltage input and line voltage output, and a resistor connecting the neutral input and neutral output.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
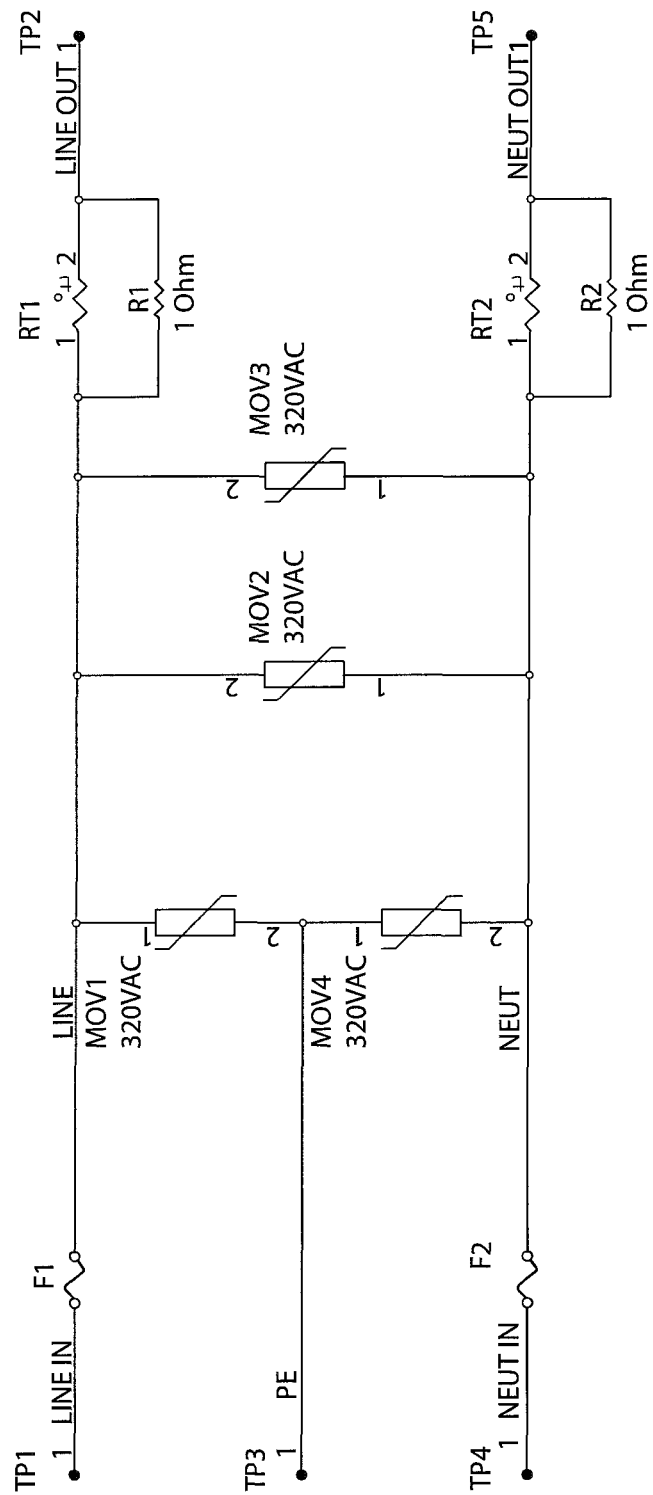
FIG. 1 is a schematic drawing of a surge suppressor circuit showing a first embodiment of the invention.

The preferred embodiment of a surge protection device uses a combination of components to mitigate transients and surges common on high voltage AC wiring. This device is wired between the incoming AC power (Line (L), Neutral (N), and Ground (G)—if present). A schematic circuit diagram for a preferred embodiment is shown in FIG. 1. The unit protects over 10 kv and 10 ka with over 1500 hits. A unique feature of a preferred embodiment is the fact that it can handle differential and common mode transients without having a dedicated earth ground. This is advantageous because in almost all cases, security lights do not have a dedicated earth ground, and the neutral and ground are tied together at the transformer. This allows transients to build up, and with no ground to dissipate those transients, they can eventually damage the light engine and/or driver. This is a well-known problem in the field, with no prior solution known to exist.

Figure 3:
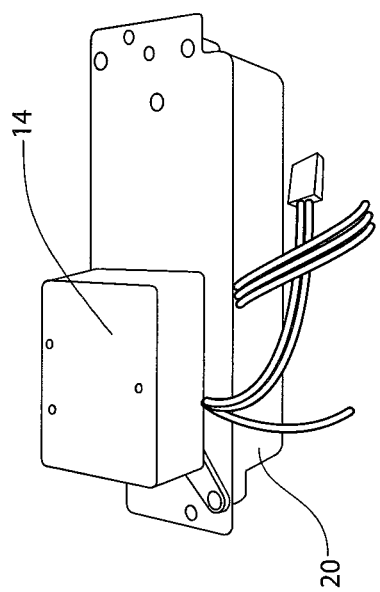
FIG. 3 shows the housing 14 mounted on the power supply 20 for the lighting circuit.
Figure 2:
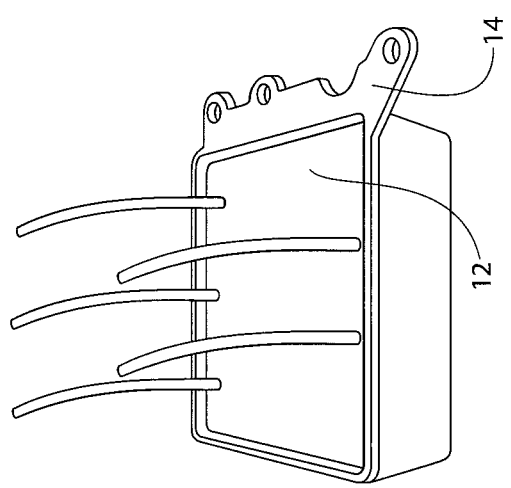
FIG. 2 shows the surge protection circuit potted 12 within a housing 14;'

As noted, the invention is particularly advantageous for security lights that have the grounds and neutrals tied together at the transformer. Lights that are mounted downstream from an electrical box would normally be grounded. The issue with unresolved transients arises in lights mounted on poles that are upstream of a residential or other separately grounded electrical box, which are the majority of cases. These have the ground and neutral tied together back at the transformer and no dedicated fixture ground. One instance of the circuit is installed in each light fixture. FIG. 2 shows the surge protection circuit potted 12 within a housing 14. FIG. 3 shows the housing 14 mounted on the power supply 20 for the lighting circuit. This assembly is located in an easily accessible area inside the light fixture and is a Field Replaceable Unit (FRU).

This unit is designed to take many hits before failure . . . literally over 1500. Of course, actual experience will depend on the degree of surge. A lightning strike will probably fry it on the first hit, but if it is just a couple of thousand volts, then it would be fine for well over 1500 hits.

The invention is applicable to various types of light sources including light emitting diodes (LED's) as well as more traditional lights could be incandescent, mercury vapor, or high pressure sodium, and can be residential or commercial installations.

The line voltages could be 120 vAC to 277 vAC with a low and high side of 90 vAC to 305 vAC components depicted in FIG. 1 have these values for a preferred embodiment:

| Reference | Part | Description | Manf | Manf PN |
|---|---|---|---|---|
| F1 | 0477016.MXEP | FUSE 500VAC 5X20 T-LAG PT 16A | Littlefuse | 0477016.MXEP |
| F2 | 0477016.MXEP | FUSE 500VAC 5X20 T-LAG PT 16A | Littlefuse | 0477016.MXEP |
| MOV1 | 320VAC | VARISTR 320VRMS 6500A 20MM STRGT | Littlefuse | V20E320P |
| MOV2 | 320VAC | VARISTR 320VRMS 6500A 20MM STRGT | Littlefuse | V20E320P |
| MOV3 | 320VAC | VARISTR 320VRMS 6500A 20MM STRGT | Littlefuse | V20E320P |
| MOV4 | 320VAC | VARISTR 320VRMS 6500A 20MM STRGT | Littlefuse | V20E320P |
| RT1 | SL121R010, NP | THERMISTOR NTC -Current Limiting 1 OHM | AMETHERM | SL121R010 |
| RT2 | SL121R010, NP | THERMISTOR NTC -Current Limiting 1 OHM | AMETHERM | SL121R010 |
| R1 | 1 Ohm | RESISTOR 1.0 OHM 1W 1% WIREWOUND | Vishay | PAC100001008FA1000 |
| R2 | 1 Ohm | RESISTOR 1.0 OHM 1W 1% WIREWOUND | Vishay | PAC100001008FA1000 |

For example, these ranges may be suitable and fall within the scope of the invention as broadly defined:

1. MOV1, 2, 3, and 4 could be any value from 120 vAC up to 600 vAC depending on the voltage ranges one is trying to protect against.

2. The MOV varistors could also use various sizes (14 mm, 16 mm, 20 mm, 22 mm, 25 mm, 32 mm, and 34 mm diameter) of bodies, depending on the amount of power handling capacity needed. The larger the body, the more power it can handle.

3. R1 and R2 can vary from 0.25 ohms up to 10 ohms to mitigate surges. However, the invention is not limited to components with those values. The line in and neutral each have a fuse for severe over-currents TP1=Line IN
TP3=Ground IN
TP4=Neutral IN
TP2=Line OUT
TP5=Neutral OUT The surge suppressor can be used with other loads, such as, but not limited to, other lighting circuits, motor circuits other resistive loads, and other electrical and/or electronic equipment.

Figure 4:
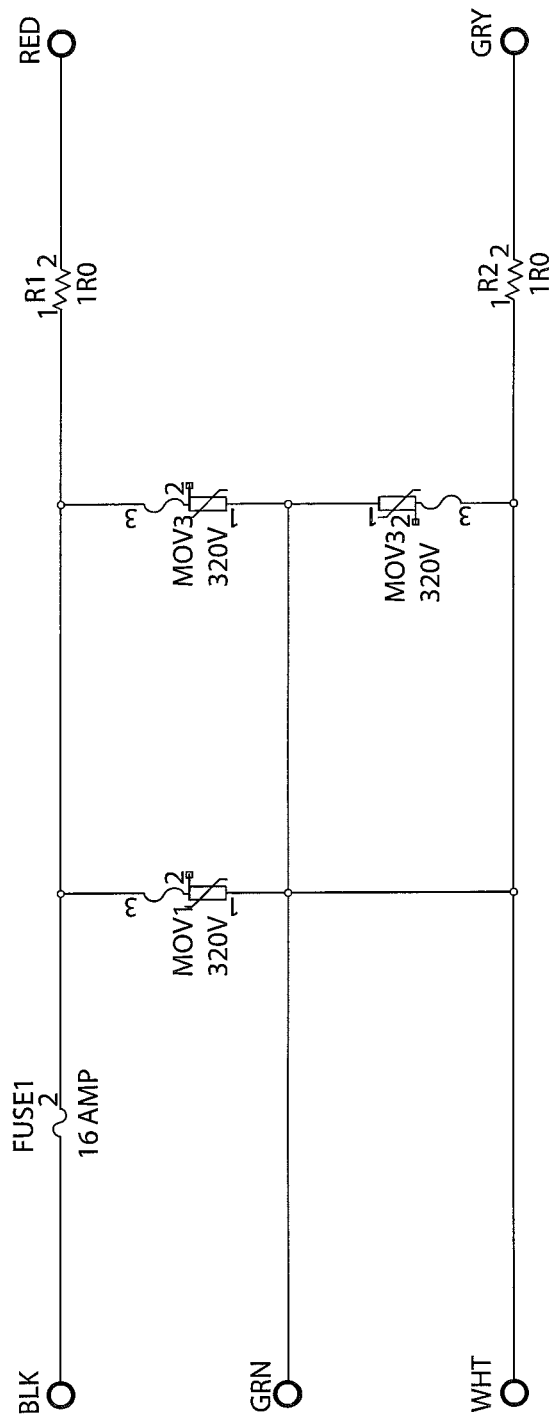
FIG. 4 shows a schematic drawing of a surge suppressor circuit showing an alternate embodiment.
Figure 5:
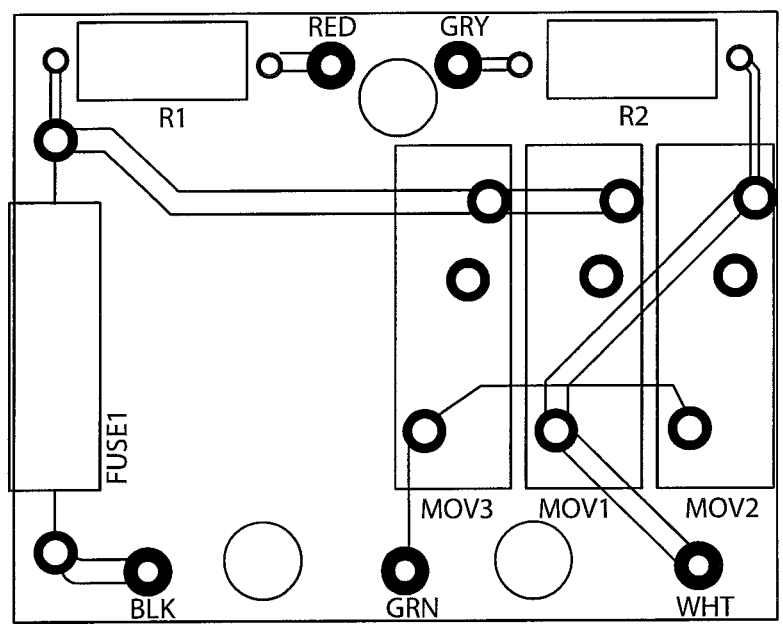
FIG. 5 shows a diagram for a printed circuit board useful for the alternate embodiment.

FIGS. 4 and 5 show an alternate embodiment. In this circuit, the two MOV's paralleled with each other and tying the "line in" and "neutral in" have been replaced with one MOV. Essentially there is one MOV across each pair of the three conductors: One between line and neutral, one between line and ground, and one between neutral and ground. The line in has a fuse for severe over-currents. Also, each of the thermistors in the "line in" and "neutral" in have been replaced with 150 ohm resistors. This embodiment allows for a higher surge capacity: –20 kv at 10 ka. In addition by decreasing the number of MOV's, the cost is reduced.

Figure 6:
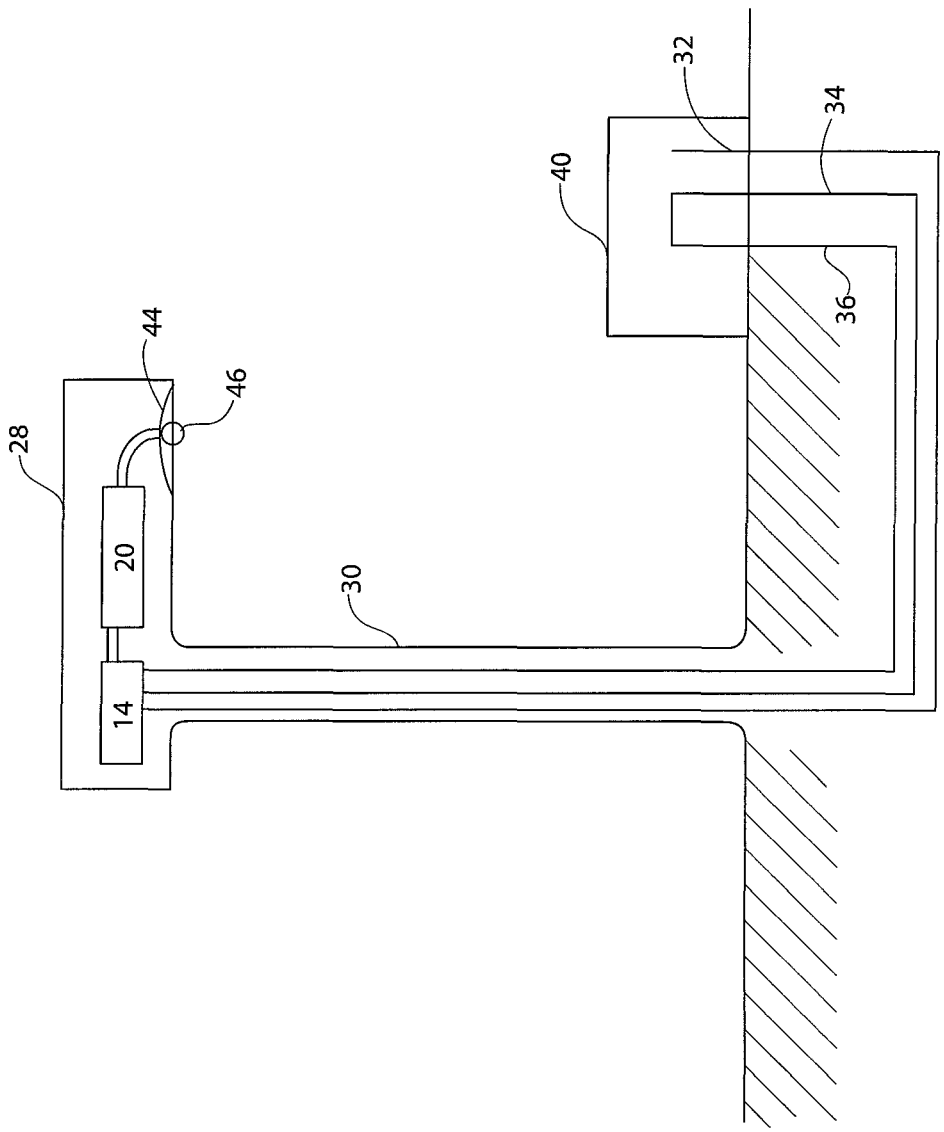
FIG. 6 shows a lighting installation using the surge protection circuit.

FIG. 6 shows an exemplary installation. A light pole 30 has a fixture 28 mounted on it. The fixture 28 houses the surge suppressor 14, power supply 20 and a socket 44 for the lamp 46. The lamp can be of various types, such as HID, LED, incandescent, fluorescent or other conventional type. The power supply 20 is selected to correspond with the lamp type, as is conventional. The pole 30 is mounted such as in a parking lot or other installation, and electricity is supplied from a power distribution transformer 40 along conductors 32, 34 and 36. In the transformer, the ground 34 and neutral 36 are tied together, but ground and neutral conductors also continue to the surge suppressor 14. A hot or "line in" conductor 32 also is provided, as shown as an output of the transformer. Transient voltages or currents that form in these conductors that may otherwise damage the light fixtures are damped and made harmless or less harmful by the surge suppressor.

The values for the varistors and other components for the FIG. 4-5 embodiment can be selected from ranges, as with the first embodiment. The surge suppressor can be used with other loads, such as, but not limited to, other lighting circuits, motor circuits other resistive loads, and other electrical and/or electronic equipment.

Certain modifications and improvements will occur to those skilled in the art upon reading the foregoing description. It should be understood that all such modifications and improvements have been omitted for the sake of conciseness and readability.

What is claimed is:

1. An apparatus for suppressing electrical surges comprising
a circuit component with
input leads for line voltage, neutral and ground, in which the neutral and ground can be electrically directly connected upstream of the circuit, and
output leads for line voltage and neutral,
a first varistor connecting the line voltage input and ground input,
second and third varistors connecting the line voltage input and neutral input,
a fourth varistor connecting the ground input and neutral input,
a thermistor paralleled with a resistor connecting the line voltage input and line voltage output, and
a thermistor paralleled with a resistor connecting the neutral input and neutral output.

2. An apparatus for suppressing electrical surges comprising
a circuit component with
input leads for line voltage, neutral and ground, in which the neutral and ground can be electrically directly connected upstream of the circuit, and
output leads for line voltage and neutral,
a first varistor connecting the line voltage input and ground input,
a second varistor connecting the line voltage input and neutral input,
a third varistor connecting the ground input and neutral input,
a resistor connecting the line voltage input and line voltage output, and
a resistor connecting the neutral input and neutral output.

3. An apparatus as claimed in claim 2 including a fuse in the input lead for the line voltage.

4. An apparatus as claimed in claim 2 further comprising a printed circuit board, wherein the varistors and resistors are mounted on the printed circuit board, with the printed circuit board having traces to provide electrically conductive paths for the circuit component.

5. A lighting installation comprising
a light fixture having a socket adapted to electrically connect to at least one lamp, the light fixture having a line voltage input, a neutral input and a ground input and a circuit for suppressing electrical surges including
output leads for line voltage and neutral to the socket,
a first varistor connecting the line voltage input and ground input,
a second varistor connecting the line voltage input and neutral input,
a third varistor connecting the ground input and neutral input,
a resistor connecting the line voltage input and line voltage output, and
a resistor connecting the neutral input and neutral output.

* * * * *